United States Patent
De Mondt

(10) Patent No.: US 10,173,449 B2
(45) Date of Patent: *Jan. 8, 2019

(54) INKJET PRINTING OF PEARLESCENT AND METALLIC COLOURS

(71) Applicant: AGFA GRAPHICS NV, Mortsel (BE)

(72) Inventor: Roel De Mondt, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

This patent is subject to a terminal disclaimer.

(21) Appl. No.: 15/536,756

(22) PCT Filed: Dec. 14, 2015

(86) PCT No.: PCT/EP2015/079520
§ 371 (c)(1),
(2) Date: Jun. 16, 2017

(87) PCT Pub. No.: WO2016/096681
PCT Pub. Date: Jun. 23, 2016

(65) Prior Publication Data
US 2018/0015760 A1    Jan. 18, 2018

(30) Foreign Application Priority Data

Dec. 18, 2014  (EP) .................................. 14198827

(51) Int. Cl.
| | |
|---|---|
| B41M 1/18 | (2006.01) |
| B41M 1/22 | (2006.01) |
| B41M 3/00 | (2006.01) |
| C09D 11/037 | (2014.01) |
| C09D 11/322 | (2014.01) |
| C09D 11/101 | (2014.01) |
| B41M 3/14 | (2006.01) |
| B41M 5/00 | (2006.01) |

(52) U.S. Cl.
CPC ............... *B41M 1/18* (2013.01); *B41M 1/22* (2013.01); *B41M 3/008* (2013.01); *B41M 3/14* (2013.01); *C09D 11/037* (2013.01); *C09D 11/101* (2013.01); *C09D 11/322* (2013.01); *B41M 5/0023* (2013.01)

(58) Field of Classification Search
None
See application file for complete search history.

(56) References Cited

U.S. PATENT DOCUMENTS

| | | | |
|---|---|---|---|
| 4,933,212 A | 6/1990 | Gerstner et al. | |
| 2005/0070640 A1* | 3/2005 | Babler | C09B 67/0033 524/88 |
| 2008/0113195 A1 | 5/2008 | Boll et al. | |
| 2008/0182085 A1* | 7/2008 | Oyanagi | C09D 11/36 428/195.1 |
| 2008/0213518 A1* | 9/2008 | Oyanagi | C09D 11/101 428/34.1 |
| 2009/0214833 A1* | 8/2009 | Oyanagi | C09D 11/322 428/195.1 |
| 2010/0171064 A1 | 7/2010 | Shim et al. | |
| 2010/0194836 A1 | 8/2010 | Prölss et al. | |
| 2010/0209677 A1 | 8/2010 | Sano et al. | |
| 2010/0279083 A1* | 11/2010 | Trummer | C09C 1/642 428/195.1 |
| 2011/0169888 A1 | 7/2011 | Edwards et al. | |
| 2011/0221805 A1* | 9/2011 | Yoshida | B41J 2/2107 347/9 |
| 2012/0125229 A1 | 5/2012 | Grüner et al. | |

FOREIGN PATENT DOCUMENTS

| | | |
|---|---|---|
| CN | 101146876 A | 3/2008 |
| WO | 2008/038867 A1 | 4/2008 |
| WO | 2008/049519 A1 | 5/2008 |
| WO | 2011/000491 A2 | 1/2011 |

OTHER PUBLICATIONS

Official Communication issued in International Patent Application No. PCT/EP2015/079520, dated Mar. 3, 2016.
De Mondt, "Inkjet Printing of Pearlescent and Metallic Colours", U.S. Appl. No. 15/523,737, filed May 2, 2017.

* cited by examiner

*Primary Examiner* — Erica Lin
(74) *Attorney, Agent, or Firm* — Keating and Bennett, LLP

(57) ABSTRACT

A method of inkjet printing a color image including a metallic or pearlescent color includes the steps of applying on part of an ink receiver a layer containing a pearlescent or metallic pigment having a volume mean particle size of at least 4.0 μm as measured by laser diffraction; and inkjet printing on part of the layer containing the pearlescent or metallic pigment a layer with an opaque color inkjet ink containing a chromatic color pigment and a white pigment.

15 Claims, No Drawings

INKJET PRINTING OF PEARLESCENT AND METALLIC COLOURS

CROSS REFERENCE TO RELATED APPLICATIONS

This application is a 371 National Stage Application of PCT/EP2015/079520, filed Dec. 14, 2015. This application claims priority to European Application No. 14198827.9, filed Dec. 18, 2014, which is incorporated by reference herein in its entirety.

BACKGROUND OF THE INVENTION

1. Field of the Invention

The present invention relates to inkjet printing a pearlescent or metallic effect on an ink receiver, such as silver coloured lines on coloured packaging.

2. Description of the Related Art

Printing systems, such as offset and flexography, are being increasingly replaced by inkjet printing systems for industrial applications, due to their flexibility in use, e.g. variable data printing, and due to their enhanced reliability allowing their incorporation into production lines. Radiation curable inkjet inks are particularly preferred because high quality colour images can be printed on non-absorbing ink-receivers, such as plastic materials.

These high quality colour images are generally printed using a CMYK inkjet ink set. However for some applications, it is desired to print pearlescent and metallic colours. For example, in packaging applications often silver and gold colours are used to give a product a certain luxury aspect or to make products stand out on the shelf. Silver and gold colours are produced in offset and flexography using special pigments having a particle size distribution of about 5 to 50 μm as well as a high aspect ratio. Often mica platelets coated with a metal oxide are used for these special pigments.

Inkjet print heads generally have nozzles with a nozzle diameter of about 25 μm in order to print fine image details. For reliable inkjet printing, as a rule of thumb, the pigments in an inkjet ink should have a particle size which is at least 50 times, preferably at least 100 times smaller than the nozzle diameter. As the special pigments currently available for printing for example a silver colour tend to have particle sizes which are equal or larger than the nozzle diameter, they are not suitable for inkjet printing.

Some companies are trying to minimize the particle size of these special pigments. WO 2011/000491 (ECKART) discloses pearlescent pigments having a d90 value of 3.5 μm, while US 2010194836 (ECKART) discloses aluminium effect pigments having a d50-value of a volume averaged particle size distribution curve of 1 μm to 15 μm with an average thickness h50 of 15 to 150 nm. However practical tests with a commercially available metallic inkjet ink of ECKART GmbH and inkjet inks containing the above described pigments show that only an inferior metallic gloss (greyish) is achievable, and also that reliable inkjet printing is not guaranteed.

The observation that a silver colour becomes greyish is caused by decreasing the particle size and the aspect ratio to a size so that it can pass through the nozzle of inkjet print heads. One solution would be to design inkjet print heads with large nozzle diameters, however then only coarse and not fine image details, like thin silver lines, can be printed.

Another active field of research is that of metallic conductive inkjet inks as disclosed by e.g. EP 2087490 A (HP), EP 2074055 A (LG CHEM) and US 2010171064 (SAMSUNG). These inkjet inks are all based on the same basic principle, i.e. inkjet printing silver nano-particles of about 10 to 50 nm followed by sintering under heat to form solid, conductive patterns of metal. These metallic conductive inkjet inks are largely irrelevant for graphic applications, such as inkjet printing silver colours on packaging materials. First of all, the sintering takes place at temperatures of more than 150 degrees Celsius which would render many common packaging materials unsuitable as ink receiving substrates in view of their thermal stability. Secondly, many sintered metal patterns do not exhibit (sufficient) metallic gloss or brilliance. And thirdly, using real silver for obtaining silver colours on a packaging would be an uneconomical solution in view of the cost of the raw material.

Some new concepts using two-component or multi-component metal nano-particles of less than 20 nm are evaluated to lower sintering temperatures, making the range of ink receivers somewhat broader. For example, US 2011169888 (ELECTRONICS FOR IMAGING) discloses that thermal curing can then take place at temperatures of about 80 to 100° C. However, such inkjet compositions generally consist of metal nano-particles and solvents that evaporate. Any organic solids in these inks drastically increase sintering temperatures. As a result poor adhesion is obtained, thus necessitating often the application of an extra undercoat coating.

US 2008213518 (SEIKO EPSON) discloses an ink-jet recording method for recording by ejecting droplets of an ink composition onto a recording medium, the method comprising forming an image using an ink set comprising: a metallic ink composition containing a metal pigment; and at least one curable ink composition selected from the group consisting of a chromatic ink composition, a black ink composition, and a white ink composition.

Therefore, there exists still a need in inkjet printing to be able to print variable data and fine image details exhibiting excellent pearlescent and metallic colours on a wide range of ink receivers, including thermo sensitive ink receivers.

SUMMARY OF THE INVENTION

In order to overcome the problems described above, preferred embodiments of the present invention have been realised with an inkjet printing method as defined below.

In retrospect, the solution of the above problem appears to be very simple. However, surprisingly in the market such a method could not be found. Nevertheless it possesses many advantages, such as variable data printing using state-of-the-art inks that produce pearlescent and metallic colours.

Further objects of the invention will become apparent from the description hereinafter.

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester group, amide group, ether group, thioether group, ketone group, aldehyde group, sulfoxide group, sulfone group, sulfonate ester group, sulphonamide group, —Cl, —Br, —I, —OH, —SH, —CN and —$NO_2$.

The term "image" includes text, numbers, graphics, logos, photos, barcodes, QR codes, and the like. An image can be defined in 1 or more colours, such an image is referred to as a colour image.

The term "pearlescent" means an iridescent lustre resembling that of pearl or mother-of-pearl, i.e. nacreous.

The term "metallic colour" means a colour with a metallic sheen or lustre, such as silver and gold, but includes other colours like e.g. metallic blue as used for a lacquer to paint cars.

Inkjet Printing Methods

The method of inkjet printing a colour image including a metallic or pearlescent colour according to the invention comprises the steps of: applying on part of an ink receiver a layer containing a pearlescent or metallic pigment having a volume mean particle size of at least 4.0 µm as measured by laser diffraction; and inkjet printing on part of the layer containing the pearlescent or metallic pigment a layer with an opaque colour inkjet ink containing a chromatic colour pigment and a white pigment.

In a preferred embodiment, the colour inkjet ink is a UV curable colour inkjet ink. The advantage of using a UV curable colour inkjet ink is that it is possible to print on a substantially non-absorbing ink receiver, contrary to e.g. aqueous inkjet inks.

In order to obtain sufficient opaqueness, the white pigment preferably has an average particle size larger than 200 nm as measured by differential centrifugal sedimentation, more preferably 220 to 400 nm.

The layer containing a pearlescent or metallic pigment may be applied by a method selected from the group consisting of coating techniques, flexographic printing, valve-jet printing, tampon printing, gravure printing, screen printing and offset printing.

In a preferred embodiment of the inkjet printing method, the opaque colour inkjet ink is preferably jetted from one or more print heads having nozzles with a nozzle diameter of no more than 35 µm. In a more preferred embodiment, the inkjet printing is performed by single pass inkjet printing.

In a preferred embodiment of the inkjet printing method, the white pigment is a titanium dioxide pigment. Such titanium dioxide pigment delivers a high opaqueness to the colour inkjet ink even at low pigment concentration.

In a preferred embodiment, the opaque colour inkjet ink includes one or more compounds selected from the group consisting of a polymerizable photoinitiator, a polymeric photoinitiator and a polymerizable compound including at least a vinylether group and an acrylate group. Such opaque colour inkjet inks are very suitable for printing on food packaging.

As already pointed out above, the layer containing a pearlescent or metallic pigment having a volume mean particle size of at least 4.0 µm can be applied at room temperature and does not require any high temperature sintering. Furthermore, the composition containing a pearlescent or metallic pigment having a volume mean particle size of at least 4.0 µm may contain other organic solids for ensuring good adhesion on a wide range of ink receivers. For example, the inclusion of a polyvinylbutyral polymer in a solvent based composition allows even adhesion to glass.

Pigments having large average particle sizes which normally would not result in reliable inkjet printing due to failing nozzles that are clogged, can now be used to maximize the lustre or brilliance of the layer containing the pearlescent or metallic pigment. Preferably, pearlescent or metallic pigments having a volume mean particle size of 5 µm to 50 µm, more preferably 10 µm to 35 µm, as measured by laser diffraction are used.

The opaqueness of the colour inkjet ink is preferably obtained by using a white pigment having an average particle size between 250 and 400 nm, more preferably between 270 and 350 nm. At average particle sizes above 400 nm inkjet printing reliability usually deteriorates rapidly.

The inkjet printing method is preferably a UV curable inkjet printing method as such a method allows obtaining high image quality by UV curing the ink directly after landing on the layer containing the metallic pigment.

There is no real restriction on how the layer containing a pearlescent or metallic pigment is applied. However, for reasons of productivity and flexibility, the layer containing a pearlescent or metallic pigment is preferably applied by a method selected from the group consisting of coating techniques, flexographic printing, valve-jet printing, tampon printing, gravure printing, screen printing and offset printing, but most preferably by flexographic printing or valve-jet printing. Suitable coating techniques include knife coating, extrusion coating, slide hopper coating and curtain coating.

In a preferred embodiment, the layer containing a pearlescent or metallic pigment is applied by a printing technique selected from the group consisting of a valve jet print head, a piezo needle print head and a through flow print head. The through flow print head is preferably a piezoelectric through flow print head Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head.

A suitable piezoelectric print head for jetting droplets containing pearlescent or metallic pigments is the through flow piezoelectric print head Xaar™ 001 of XAAR, which jets droplets having a volume of up to 200 nL typically at a viscosity between 5 and 35 mPa·s and allows particles having a particle size of 25 μm to be present.

Another preferred print head for jetting droplets containing pearlescent or metallic pigments is a so-called valvejet print head. A valvejet print head is also called coil package or micro valves or a dispensing module of micro valves. The droplet forming means in a valvejet print head controls a micro valve in the valvejet print head by actuating electromagnetically to close or to open the micro valve so that the liquid flows through the liquid channel. Valvejet print heads preferably have a maximum dispensing frequency up to 3000 Hz. The way to incorporate valvejet print heads into an inkjet printing device is well-known to the skilled person. For example, US 2012105522 (MATTHEWS RESOURCES) discloses a valvejet printer including a solenoid coil and a plunger rod having a magnetically susceptible shank. Suitable commercial valvejet print heads are HSV400 and HSV800 from ZIMMER, Printos™ P16 from VideoJet and the coil packages of micro valve SMLD 300's from FRITZ GYGER™. A nozzle plate of a valvejet print head is often called a faceplate and is preferably made from stainless steel.

A piezo needle print head is also suitable for jetting the metallic and pearlescent pigments. Such print heads have been used, for example, in a digital textile printer by ZIMMER at ITMA2003, where the technology was called FlatJet™ technology. The functioning of a piezo needle print head is described e.g. in U.S. Pat. No. 6,460,980 (HEGEDUS ET AL).

In order to achieve very fine image details, like thin silver lines having a width of no more than 0.5 mm, the inkjet printing of the opaque colour inkjet ink is preferably performed by one or more print heads having nozzles with a nozzle diameter of no more than 35 μm, preferably no more than 25 μm. These print heads are preferably piezoelectric print heads, more preferably through flow piezoelectric print heads.

Suitable commercial piezoelectric print heads for jetting ink droplets having a volume of up to 30 pL are available from many sources such as XAAR, KYOCERA, RICOH and TOSHIBA TEC.

Pearlescent and Metallic Pigments

The method of inkjet printing according to a preferred embodiment of the present invention includes the step of applying on part of an ink receiver a layer containing a pearlescent or metallic pigment. Such pigments are well-known to a person skilled in the art of preparing inks containing pearlescent or metallic pigments. These pigments are also readily commercially available, and generally have a volume mean particle size of at least 3.0 μm.

In a preferred embodiment, the pearlescent or metallic pigment has an average particle size between 5.0 and 50.0 μm.

The pigments may be included in aqueous, solvent based and UV curable inks, such as flexo inks.

There is no real restriction on the type of pearlescent or metallic pigment.

A wide range of these pigments and their preparation is described in literature. For example, U.S. Pat. No. 5,972,098 (MERCK) discloses the preparation of titanate-containing pearlescent pigments.

Suitable commercially available metallic pigments are Xirallic™ grades from MERCK, which are aluminum oxide platelets covered with titanium oxide showing a strong glitter effect with a distinct shimmering behaviour.

Also suitable are mica platelets coated with titanium dioxide and/or iron oxide. Commercially available pearlescent pigments are available as Mearlin™ grades from BASF and Symic™ grades from ECKART.

The metallic pigment may mimic the following metals: silver, bronze, brass, platinum, steel, chromium, titanium and Britannia metal. The metallic pigment preferably has a silver colour.

Preferred metallic pigments include plate-like crystals of bismuth oxychloride that have a silver-white and transparent appearance Such metallic pigments are available as Mearlite™ lustre pigments from BASF.

The metallic pigments include also vacuum-metallized aluminum pigments (VMPs) such as the Metasheen™ grades from BASF. The latter are composed of lamellar, non-leafing aluminum flakes dispersed in a variety of solvents.

Other suitable commercial vacuum metallized pigments include the Starbrite™ Reveal VMF pigments from SILBERLINE, generally having a particle size D50 of 8 to 12 μm.

Opaque Colour Inkjet Inks

The method of inkjet printing a colour image including a metallic or pearlescent colour according to the present invention uses one or more opaque colour inkjet inks containing a chromatic colour pigment and a white pigment. Opaqueness can be very easily checked by looking at the projected image by an overhead projector of an ink receiver carrying a 10 μm layer of the opaque colour inkjet ink. If no colour can be distinguished in the projected image, then the colour inkjet ink is an opaque colour inkjet ink.

In a more preferred embodiment, a set of opaque colour inkjet inks is used. The colour inkjet ink set preferably includes a cyan inkjet ink (C), a magenta inkjet ink (M), and a yellow inkjet ink (Y), and more preferably also a black inkjet ink, and most preferably also at least a white inkjet ink (W). The inkjet ink set is preferably a UV curable CMYK inkjet ink set.

The CMYK inkjet ink set may also be extended with extra inks such as black, white, red, green, blue, and/or orange. The inkjet ink set may also be extended by the combination of the full density inkjet inks with light density inkjet inks. The combination of dark and light colour inks and/or black and grey inks improves the image quality by a lowered graininess.

The inkjet ink set may also contain one or more spot colour inkjet inks. By using spot colours, such as e.g. the red colour of Coca-Cola™, ink consumption can be reduced.

The inkjet ink set may also include a varnish, preferably a UV curable varnish. A varnish allows to influence the glossiness of the colour image in a desired way Chromatic Colour Pigments A chromatic colour pigment is a colour pigment having a colour different from white and black. The colour pigments may be cyan, magenta, yellow, red, orange, violet, blue, green, brown, mixtures thereof, and the like The colour inkjet ink contains at least a chromatic colour pigment but may be combined with a dye. Organic and/or inorganic colour pigments may be used. The chromatic colour pigment may be chosen from those disclosed by HERBST, Willy, et al. Industrial Organic Pigments, Production, Properties, Applications. 3rd edition. Wiley-VCH, 2004. ISBN 3527305769.

Particular preferred chromatic colour pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213. In a particularly preferred embodiment of the inkjet printing method, the yellow pigment is selected from the group consisting of C.I. Pigment Yellow 150, C.I. Pigment Yellow 155, C.I. Pigment Yellow 180, and C.I Pigment Yellow 213.

Particular chromatic colour preferred pigments are C.I. Pigment Red 17, 22, 23, 41, 48:1, 48:2, 49:1, 49:2, 52:1, 57:1, 88, 112, 122, 144, 146, 149, 170, 175, 176, 184, 185, 188, 202, 206, 207, 210, 216, 221, 248, 251, 254, 255, 264, 266, 270 and 272.

Particular preferred chromatic colour pigments are C.I. Pigment Violet 19, 23, 32, and 37.

Particular preferred chromatic colour pigments are C.I. Pigment Blue 15:1, 15:2, 15:3, 15:4, 15:6, 16, 56, 61 and (bridged) aluminium phthalocyanine pigments.

Particular preferred chromatic colour pigments are C.I. Pigment Orange 5, 13, 16, 34, 40, 43, 59, 66, 67, 69, 71 and 73.

Particular preferred chromatic colour pigments are C.I. Pigment Green 7 and 36.

Particular preferred chromatic colour pigments are C.I. Pigment Brown 6 and 7.

Suitable pigments include mixed crystals of the above particular preferred pigments. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of several of these lines is one of the criteria of the formation of solid solutions. Particularly preferred commercially available mixed crystals include Cinquasia™ Magenta RT-355-D and Cinquasia™ Magenta D 4500 J, from BASF.

It is also possible to make mixtures of pigments.

Also non-organic pigments may be present in the inks. Suitable pigments are C.I. Pigment Metal 1, 2 and 3. Illustrative examples of the inorganic pigments include yellow lead, zinc yellow, red iron oxide (III), cadmium red, ultramarine blue, prussian blue, chromium oxide green, cobalt green, and amber. However, care should be taken to prevent migration and extraction of heavy metals in case of food packaging application. In the preferred embodiment no pigments are used which contain a heavy metal selected from the group consisting of arsenic, lead, mercury and cadmium. In a more preferred embodiment, no inorganic pigments are used in the inkjet inks with the exception of titanium oxide and calcium carbonate.

Pigment particles in inkjet ink should be sufficiently small to permit free flow of the ink through the inkjet-printing device, especially at the ejecting nozzles. It is also desirable to use small particles for maximum colour strength and to slow down sedimentation.

The average pigment particle size of the chromatic colour pigment is preferably between 50 and 230 nm, more preferably between 70 and 200 nm. Most preferably, the average pigment particle size is no larger than 150 nm. An average particle size smaller than 50 nm is less desirable for decreased light-fastness.

The average pigment particle size of pigment particles is best determined with dynamic light scattering, such as e.g. a PSS-Nicomp™ submicron particle analyzer. Furthermore, this methodology is well-known to the skilled person.

White Pigments

The opaque colour inkjet ink contains at least one white pigment. The white pigment is preferably a pigment with a refractive index greater than 1.60, preferably greater than 2.00, more preferably greater than 2.50 and most preferably greater than 2.60. A single type of white pigment or a combination of white pigments may be employed.

In a particularly preferred embodiment, titanium dioxide is used as the white pigment. Titanium oxide occurs in the crystalline forms of anatase type, rutile type and brookite type. The anatase type has a relatively low density and is easily ground into fine particles, while the rutile type has a relatively high refractive index, exhibiting a high covering power. Either one of these is usable in this invention. It is preferred to make the most possible use of characteristics and to make selections according to the use thereof. The use of the anatase type having a low density and a small particle size can achieve superior dispersion stability, ink storage stability and ejectability. At least two different crystalline forms may be used in combination. The combined use of the anatase type and the rutile type which exhibits a high colouring power can reduce the total amount of titanium oxide, leading to improved storage stability and ejection performance of ink.

For surface treatment of the titanium oxide, an aqueous treatment or a gas phase treatment may be applied, and an alumina-silica treating agent may be employed. Untreated-, alumina treated- or alumina-silica treated-titanium oxide are employable.

The determination of the average particle diameter is best performed by using a disc centrifuge (DCS), such as the CPS24000 of CPS instruments.

The pigment is preferably used in a pigment dispersion used for preparing inkjet inks in an amount of 10 to 55 wt %, more preferably of 15 to 50 wt % based on the total weight of the pigment dispersion. In the opaque colour inkjet ink, the pigment is preferably present in an amount of 7 to 30 wt %, preferably 10 to 25 wt % based on the total weight of the opaque colour inkjet ink.

Polymeric Dispersants

The colour pigment and the white pigment are preferably dispersed using a polymeric dispersant.

Typical polymeric dispersants are copolymers of two monomers but the polymeric dispersant may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);
alternating polymerized monomers (e.g. monomers A and B polymerized into ABABABAB);
gradient (tapered) polymerized monomers (e.g. monomers A and B polymerized into AAABAABBABBB);
block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30,000, more preferably between 10,000 and 25,000.

The polymeric dispersant has preferably a weight average molecular weight Mw smaller than 100,000, more preferably smaller than 70,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;
SOLSPERSE™ dispersants available from LUBRIZOL;
TEGO™ DISPERS™ dispersants from EVONIK;
EDAPLAN™ dispersants from MÜNZING CHEMIE;
ETHACRYL™ dispersants from LYONDELL;
GANEX™ dispersants from ISP;
DISPEX™ and EFKA™ dispersants from BASF;
DISPONER™ dispersants from DEUCHEM.

Particularly preferred polymeric dispersants include Solsperse™ dispersants from LUBRIZOL, Efka™ dispersants from BASF and Disperbyk™ dispersants from BYK CHEMIE GMBH. Particularly preferred dispersants are Solsperse™ 32000, 35000 and 39000 dispersants from LUBRIZOL.

The polymeric dispersant is preferably used in an amount of 2 to 600 wt %, more preferably 5 to 200 wt %, most preferably 50 to 90 wt % based on the weight of the pigment.

Photoinitiators

The UV curable inkjet ink contains at least one photoinitiator, but may contain a photoinitiating system including a plurality of photoinitiators and/or co-initiators.

The photoinitiator in preferably a free radical initiator, more specifically a Norrish type I initiator or a Norrish type II initiator. A free radical photoinitiator is a chemical compound that initiates polymerization of monomers and oligomers when exposed to actinic radiation by the formation of a free radical. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photoinitiators are disclosed in CRIVELLO, J. V., et al. Photoinitiators for Free Radical Cationic and Anionic Photopolymerization. 2nd edition. Edited by BRADLEY, G. London, UK: John Wiley and Sons Ltd, 1998. p. 287-294.

Specific examples of photoinitiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4,4-trimethylpentylphosphine oxide, 2,4,6 trimethylbenzoyldiphenylphosphine oxide, 2,4,6-trimethoxybenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photoinitiators include Irgacure™ 184, Irgacure™ 500, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For food packaging applications, so-called UV curable low migration inkjet inks are used wherein the photoinitiator is preferably a so-called diffusion hindered photoinitiator. A diffusion hindered photoinitiator is a photoinitiator which exhibits a much lower mobility in a cured layer of the ink than a monofunctional photoinitiator, such as benzophenone. Several methods can be used to lower the mobility of the photoinitiator. One way is to increase the molecular weight of the photoinitiators so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators.

The diffusion hindered photoinitiator is preferably selected from the group consisting of non-polymeric multifunctional photoinitiators, oligomeric or polymeric photoinitiators and polymerizable photoinitiators. Non-polymeric di- or multifunctional photoinitiators are considered to have a molecular weight between 300 and 900 Dalton. Non-polymerizable monofunctional photoinitiators with a molecular weight in that range are not diffusion hindered photoinitiators. Most preferably the diffusion hindered photoinitiator is a polymerizable initiator or a polymeric photoinitiator.

Another advantage of using one or more diffusion hindered photoinitiators is the resulting low odour after UV curing. This is advantageously used in e.g. luxury packaging including a metallic decoration for perfumes, wine, beer labels, cosmetics, cigarettes, razorblades, toothpaste and the like.

A preferred diffusion hindered photoinitiator contains one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulphides, α-haloketones, α-halosulfones and phenylglyoxalates.

A preferred diffusion hindered photoinitiator contains one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2065362 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2161264 A (AGFA). A preferred amount of photoinitiator is 0-50 wt %, more preferably 0.1-20 wt %, and most preferably 0.3-15 wt % of the total weight of the UV curable inkjet ink.

In a very preferred embodiment, the UV curable inkjet ink includes a polymerizable or polymeric thioxanthone photoinitiator and an acylphosphine oxide-based polymerization photoinitiator, more preferably a bis(2,4,6-trimethylbenzoyl)-phenylphosphineoxide photoinitiator.

Photoinitiators like bis(2,4,6-trimethylbenzoyl)-phenylphosphineoxide photoinitiator are monofunctional but are allowed by the Swiss ordinance SR 817.023.21 on Objects and Materials due to their very low toxicity level.

In order to increase the photosensitivity further, the UV curable inkjet ink may additionally contain co-initiators. Suitable examples of co-initiators can be categorized in three groups: 1) tertiary aliphatic amines such as methyldiethanolamine, dimethylethanolamine, triethanolamine, triethylamine and N-methylmorpholine; (2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and (3) (meth)acrylated amines such as dialkylamino alkyl(meth)acrylates (e.g., diethylaminoethylacrylate) or N-morpholinoalkyl-(meth)acrylates (e.g., N-morpholinoethyl-acrylate). The preferred co-initiators are aminobenzoates.

When one or more co-initiators are included into the UV curable inkjet ink, preferably these co-initiators are diffusion hindered for safety reasons.

A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators. Most preferably the diffusion hindered co-initiator is a polymerizable co-initiator having at least one (meth) acrylate group, more preferably having at least one acrylate group.

The UV curable inkjet ink preferably includes a polymerizable or polymeric tertiary amine co-initiator.

Preferred diffusion hindered co-initiators are the polymerizable co-initiators disclosed in EP 2053101 A (AGFA) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 A (AGFA).

The UV curable inkjet ink preferably includes the (diffusion hindered) co-initiator in an amount of 0.1 to 50 wt %, more preferably in an amount of 0.5 to 25 wt %, most preferably in an amount of 1 to 15 wt % of the total weight of the UV curable inkjet ink.

Polymerizable Compounds

The polymerizable compounds are preferably monomers and/or oligomers.

The monomers and oligomers used in UV curable inkjet inks, especially for food packaging applications, are preferably purified compounds having no or almost no impurities, more particularly no toxic or carcinogenic impurities. The impurities are usually derivative compounds obtained during synthesis of the polymerizable compound. Sometimes, however, some compounds may be added deliberately to pure polymerizable compounds in harmless amounts, for example, polymerization inhibitors or stabilizers.

Any monomer or oligomer capable of free radical polymerization may be used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. The viscosity of the UV curable inks can be adjusted by varying the ratio between the monomers and oligomers.

Particularly preferred monomers and oligomers are those listed in [0106] to [0115] in EP 1911814 A (AGFA).

Polymerization Inhibitors

The UV curable inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from BASF; Floorstab™ UV range (UV-1, UV-2, UV-5 and UV-8) from Kromachem Ltd, Additol™ S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % of the total inkjet ink.

In a preferred embodiment, the polymerization inhibitor is a polymerizable inhibitor, preferably containing one or more acrylate groups for achieving good reactivity.

Surfactants

The opaque colour inkjet ink may contain at least one surfactant. The surfactant can be anionic, cationic, non-ionic, or zwitter-ionic and is preferably added in a total quantity less than 3 wt % based on the total weight of the ink and particularly in a total less than 1 wt % based on the total weight of the UV curable inkjet ink.

Preferred surfactants are selected from fluoro surfactants (such as fluorinated hydrocarbons) and silicone surfactants. The silicone surfactants are preferably siloxanes and can be alkoxylated, polyester modified, polyether modified, polyether modified hydroxy functional, amine modified, epoxy modified and other modifications or combinations thereof. Preferred siloxanes are polymeric, for example polydimethylsiloxanes.

Preferred commercial silicone surfactants include BYK® 333 and BYK™ UV3510 from BYK Chemie.

In a preferred embodiment, the surfactant is a polymerizable compound.

Preferred polymerizable silicone surfactants include a (meth)acrylated silicone surfactant. Most preferably the (meth)acrylated silicone surfactant is an acrylated silicone surfactant, because acrylates are more reactive than methacrylates.

In a preferred embodiment, the (meth)acrylated silicone surfactant is a polyether modified (meth)acrylated polydimethylsiloxane or a polyester modified (meth)acrylated polydimethylsiloxane.

Preferred commercially available (meth)acrylated silicone surfactants include: Ebecryl™ 350, a silicone diacrylate from Cytec; the polyether modified acrylated polydimethylsiloxane BYK™ UV3500 and BYK™ UV3530, the polyester modified acrylated polydimethylsiloxane BYK™ UV3570, all manufactured by BYK Chemie; Tego™ Rad 2100, Tego™ Rad 2200N, Tego™ Rad 2250N, Tego™ Rad 2300, Tego™ Rad 2500, Tego™ Rad 2600, and Tego™ Rad 2700, Tego™ RC711 from EVONIK; Silaplane™ FM7711, Silaplane™ FM7721, Silaplane™ FM7731, Silaplane™ FM0711, Silaplane™ FM0721, Silaplane™ FM0725, Silaplane™ TM0701, Silaplane™ TM0701T all manufactured by Chisso Corporation; and DMS-R05, DMS-R11, DMS-R18, DMS-R22, DMS-R31, DMS-U21, DBE-U22, SIB1400, RMS-044, RMS-033, RMS-083, UMS-182, UMS-992, UCS-052, RTT-1011 and UTT-1012 all manufactured by Gelest, Inc.

Ink Receivers and Printed Articles

There is no real limitation on the type of ink receiver. The ink receiver may have ceramic, metallic, wood, leather, paper or polymeric surfaces for printing. The ink receiver may also be primed.

However, the advantages of the UV curable compositions and inkjet of the invention can be especially advantageously used on ink receivers for (food)packaging, cosmetics, perfumes, toothpaste and pharmaceuticals. Food packaging is understood to include also packaging for liquids and drinks like milk, water, coke, beer, vegetable oil and the like.

The invention is advantageously used for providing so-called "primary" food packaging. Primary food packaging is the material that first envelops the product and holds it. This usually is the smallest unit of distribution or use and is the package which is in direct contact with the contents. Secondary packaging is outside the primary packaging is used to group primary packages together. Tertiary packaging is used for bulk handling, warehouse storage and transport shipping. The most common form of tertiary packaging is a palletized unit load that packs tightly into containers.

A colour image including a metallic or pearlescent colour produced according to the present invention on (primary) packaging has the advantage that it make products stand out on the shelf. Such effect can be enhanced by using a transparent ink receiver that allows to view the content of the packaging, and this by using a single ink receiver as packaging material and avoiding multiple packaging materials and glue as required by state-of-the-art packaging.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyurethane, polyvinyl chloride, polyesters like polyethylene terephthalate (PET), polyethylene naphthalate (PEN) and polylactide (PLA), polyimide, copolymers thereof and blends thereof.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

In a preferred embodiment of the inkjet printing method, the ink receiver is a transparent substrate. When viewing the image through the transparent substrate, it was surprisingly found that a hologram was mimicked. The layer containing a pearlescent or metallic pigment viewed through the transparent substrate obtained a reflection similar to that of a mirror. Where the colour inkjet ink was printed on the layer containing a pearlescent or metallic pigment, the mirror-like reflection was destroyed. Such a feature can be used as a security feature in a security document such as, for example, in identification cards, bank cards, credit cards, and driver licenses.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

Inkjet Printing Devices

The inkjet inks may be jetted by one or more print heads ejecting small droplets in a controlled manner through nozzles onto a substrate, which is moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type.

The inkjet print head normally scans back and forth in a transversal direction across the moving ink-receiver surface. Often the inkjet print head does not print on the way back. Bi-directional printing, also known as multi-pass printing, is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

Curing Devices

The radiation curable inkjet ink can be cured by electron beam or UV light. Preferably the radiation curable inkjet ink is a UV curable inkjet ink, which is preferably cured by exposure to ultraviolet radiation, most preferably coming exclusively from UV LEDs. The curing device may be arranged in combination with the print head of the inkjet printer, travelling therewith so that the curing radiation is applied very shortly after jetting. Such rapid curing is sometimes referred to as "pin curing" and used for enhancing image quality by controlling the dot size. Preferably such curing means consists of one or more UV LEDs. In such an arrangement, it can be difficult to provide other types of curing means that are small enough to be connected to and travelling with the print head. Therefore, a static fixed radiation source may be employed, e.g. a source of curing UV-light, connected to the radiation source by means of flexible radiation conductive means such as a fibre optic bundle or an internally reflective flexible tube. Alternatively, the actinic radiation may be supplied from a fixed source to the radiation head by an arrangement of mirrors including a mirror upon the print head.

The source of radiation may also be an elongated radiation source extending transversely across the substrate to be cured. It may be adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device contains one or more UV LEDs with a wavelength larger than 360 nm, preferably one or more UV LEDs with a wavelength larger than 380 nm, and most preferably UV LEDs with a wavelength of about 395 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

For facilitating curing, the inkjet printing device often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the following examples were readily available from standard sources such as Sigma-Aldrich (Belgium) and Acros (Belgium) unless otherwise specified PB15:4 is an abbreviation used for Hostaperm™ Blue P-BFS, a C.I. Pigment Blue 15:4 pigment from CLARIANT.

TiO2 is a titanium dioxide available as RDI-S from KEMIRA.

DB162 is an abbreviation used for the polymeric dispersant Disperbyk™ 162 available from BYK CHEMIE GMBH whereof the solvent mixture of 2-methoxy-1-methylethylacetate, xylene and n-butylacetate was removed.

INHIB is a mixture forming a polymerization inhibitor having a composition according to Table 5.

TABLE 5

| Component | wt % |
|---|---|
| VEEA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

BHT is an abbreviation for 2,6-di-tert.butyl-4-methylphenol (CASRN128-37-0) from ALDRICH CHEMICAL CO.

VEEA is 2-(2-vinyloxyethoxy)ethyl acrylate, a difunctional monomer available from Nippon Shokubai, Japan.

BAPO is a bis(2,4,6-trimethylbenzoyl)-phenylphosphineoxide photoinitiator available as Irgacure™ 819 from BASF.

Genomer™ 5275 is an acrylated oligamine supplied by Rahn AG.

Genopol™ BP-2 is a polymeric benzophenone photoinitiator supplied by Rahn AG.

Craynor™ 704 is an acrylated polyester adhesion promoter from SARTOMER.

Coatosil™ 7500 is polyalkyleneoxide modified polydimethylsiloxane surfactant available from Momentive Performance Materials.

PMMA is a transparent polymethylmethacrylate ink receiver for which BARLO™ XT from ANTALIS, Belgium and manufactured by BARLO, Germany was used.

Ultrastar™ FX-1504 Silver is a solvent based flexo ink containing a metallic pigment listed to have an average particle size of 6 μm available from ECKART GMBH.

Measurement Methods

1. Average Particle Size Pigment Dispersion

The particle size of pigment particles in a pigment dispersion was determined by photon correlation spectroscopy at a wavelength of 633 nm with a 4 mW HeNe laser on a diluted sample of the pigment dispersion. The particle size analyzer used was a Malvern™ nano-S available from Goffin-Meyvis.

2. Volume Mean Particle Size of Metallic/Pearlescent Pigments

The particle size distribution was determined in the range of 0.04 to 2000 μm by laser diffraction using a Coulter™ LS230 with PIDS assembly. A sample was first diluted to 1% using a suitable diluent, e.g. one of the liquids present in the sample. For example, water respectively isopropanol may be used for water based respectively solvent based dispersions of metallic or pearlescent pigments. The diluted sample was added to the small volume module, filled with the diluent, until the parameter obscuration obtained a value between 45 and 55%. Once this was achieved, three consecutive measurements were made. The volume mean particle size is the average of the three values of the volume mean particle size determined in each of the three measurements.

3. Viscosity

The viscosity of the formulations was measured at 45° C. using a Haake Rotovisco rheometer with sensor C60/1 Ti. An aliquot of 1.5 mL was used and analyzed at a shear rate of 1,000 s$^{-1}$. For inkjet printing, a viscosity of less than 20 mPa·s at 45° C. is preferred, more preferably the viscosity was less than 15 mPa·s.

4. Surface Tension

The surface tension of an opaque colour inkjet ink was measured with a KRÜSS tensiometer K9 at 25° C. after 60 seconds. The surface tension of is preferably from 20 to 50 mN/m at 25° C., more preferably from 22 to 35 mN/m at 25° C. It is preferably 20 mN/m or more from the viewpoint of printability by a second inkjet ink, and it is preferably not more than 35 mN/m from the viewpoint of the wettability.

Example 1

This example illustrates how thin silver coloured lines can be obtained by the inkjet printing method according to a preferred embodiment of the present invention.

Preparation of Concentrated Colour Pigment Dispersion CD

A concentrated pigment dispersion CD was prepared having a composition according to Table 1.

TABLE 1

| wt % of | CD |
| --- | --- |
| PB15:4 | 15 |
| DB162 | 15 |
| INHIB | 1 |
| VEEA | 69 |

The concentrated pigment dispersion CD was made by mixing 15 kg of the pigment PB15:4 1 kg of INHIB and 50 kg of a 30% solution of the polymeric dispersant DB162 in VEEA for 30 minutes using a DISPERLUX™ dissolver (from DISPERLUX S.A.R.L., Luxembourg) and subsequently milling this mixture in a Bachofen Dynomill™ ECM Poly mill using yttrium-stabilized zirconium oxide-beads of 0.4 mm diameter ("high wear resistant zirconia grinding media" from TOSOH Co.). The bead mill is filled for 42% with the grinding beads and water-cooled during milling at a flow rate of 8 mL/min for 180 minutes. After milling the dispersion was separated from the beads using a filter cloth. The average particle size was determined to be 86 nm.

Preparation of Concentrated White Pigment Dispersion WD

A concentrated white pigment dispersion WD was prepared having a composition according to Table 2.

TABLE 2

| wt % of: | W1 |
| --- | --- |
| TiO2 | 50.00 |
| DB162 | 4.00 |
| INHIB | 1.00 |
| VEEA | 45.00 |

The concentrated pigment dispersion WD was made by mixing in VEEA, 100 kg of the white pigment TiO2, 2 kg of the inhibitor INHIB and 26.7 kg of a 30% solution of the polymeric dispersant DB162 in VEEA for 30 minutes in a 60 L vessel equipped with a DISPERLUX™ disperser (from DISPERLUX S.A.R.L., Luxembourg). This mixture was subsequently milled in a DYNO™-MILL KD 6 from the company WAB Willy A. Bachofen (Switzerland) using 0.65 mm yttrium-stabilized zirconium oxide-beads. The bead mill was filled for 42% with the grinding beads and operated in recirculation mode for 1 hour by using a tip speed of 14.7 m/s. The milling chamber is water-cooled during the operation. The average particle size was determined to be 230 nm.

Preparation of Colour Inkjet Ink C1

The concentrated pigment dispersions CD and WD were used to manufacture the opaque colour inkjet ink C1 by mixing them with ingredients according to Table 3.

TABLE 3

| in wt % of ink | C1 |
| --- | --- |
| VEEA | 57.39 |
| INHIB | 1.11 |
| BAPO | 3.00 |
| Genomer ™ 5275 | 6.00 |
| Genopol ™ BP-2 | 2.00 |
| Craynor ™ 704 | 7.00 |
| DB162 | 2.50 |
| PB15:4 | 0.90 |
| TiO2 | 20.00 |
| Coatosil ™ 7500 | 0.10 |

The opaque inkjet ink C1 was filtered over a 0.4 μm filter. The physical properties of the inkjet ink C1 was measured and are shown by Table 4.

TABLE 4

| Physical Properties | C1 |
| --- | --- |
| Viscosity at 45° C. (mPa · s) | 13.8 |
| Surface tension (mN/m) | 29.5 |

Preparation of Printed Article

The volume mean particle size of a solvent based flexo ink Ultrastar™ FX-1504 Silver was determined using laser diffraction and a dilution of 0.5 mL in 50 mL of isopropanol. The volume mean particle size was found to be 11.2 μm.

The solvent based flexo ink Ultrastar™ FX-1504 Silver was coated on part of a transparent PMMA ink receiver using a bar coater and a 10 μm wired bar. The partially coated ink receiver was dried at 25° C. After drying, part of the coated ink receiver had a mirror-like silver colour.

A test image containing a thin line pattern was printed with a Dimatix DMP 2831 from FUJIFILM at a jetting temperature of 45° C. at with the opaque colour inkjet ink on the layer containing the metallic pigment. Fine silver thin lines were obtained. The printing method proved to be very suitable for printing luxury packaging.

When viewing the image through the transparent PMMA substrate, it was surprisingly found that a hologram was mimicked. The layer containing a metallic pigment viewed through the transparent substrate obtained a reflection similar to that of a mirror. Where the colour inkjet ink was printed on the layer containing a metallic pigment, the mirror-like reflection was destroyed. Such a feature can be used as a security feature in a security document.

The invention claimed is:

1. A method of inkjet printing a color image including a metallic or pearlescent color, the method comprising the steps of:
    applying on a portion of an ink receiver a layer including a pearlescent or metallic pigment having a volume mean particle size of at least 5.0 μm as measured by laser diffraction; and
    inkjet printing on the layer including the pearlescent or metallic pigment a color image including an opaque color inkjet ink including a chromatic color pigment and a white pigment.
2. The method according to claim 1, wherein the opaque color inkjet ink is a UV curable color inkjet ink.
3. The method according to claim 1, wherein the white pigment has an average particle size larger than 200 nm as measured by differential centrifugal sedimentation.

4. The method according to claim 1, wherein the color image including the pearlescent or metallic pigment is applied by a method selected from the group consisting of coating, flexographic printing, valve-jet printing, tampon printing, gravure printing, screen printing, and offset printing.

5. The method according to claim 1, wherein the step of inkjet printing the opaque color inkjet ink includes using at least one print head including nozzles with a nozzle diameter of no more than 35 μm.

6. The method according to claim 1, wherein the step of inkjet printing the opaque color inkjet ink includes single pass inkjet printing.

7. The method according to claim 1, wherein the volume mean particle size of the pearlescent or metallic pigment is between 5.0 μm and 50.0 μm.

8. The method according to claim 1, wherein the ink receiver is transparent.

9. The method according to claim 1, wherein the white pigment includes a titanium dioxide pigment.

10. The method according to claim 1, wherein the opaque color inkjet ink includes one or more compounds selected from the group consisting of a polymerizable photoinitiator, a polymeric photoinitiator, and a polymerizable compound including at least a vinylether group and an acrylate group.

11. The method according to claim 1, wherein the ink receiver is packaging.

12. A printed article comprising:
   the color image printed by the inkjet printing method according to claim 1.

13. The printed article according to claim 12, wherein the printed article is selected from the group consisting of packaging and a foil.

14. The printed article according to claim 13, wherein the packaging is selected from the group consisting of food packaging, cosmetic packaging, perfume packaging, toothpaste packaging, and pharmaceutical packaging.

15. The printed article according to claim 12, wherein the printed article is a security document.

* * * * *